April 17, 1962  L. PÉRAS  3,029,625
AUTOMOBILE HOOD LOCK
Filed June 14, 1960  2 Sheets-Sheet 1
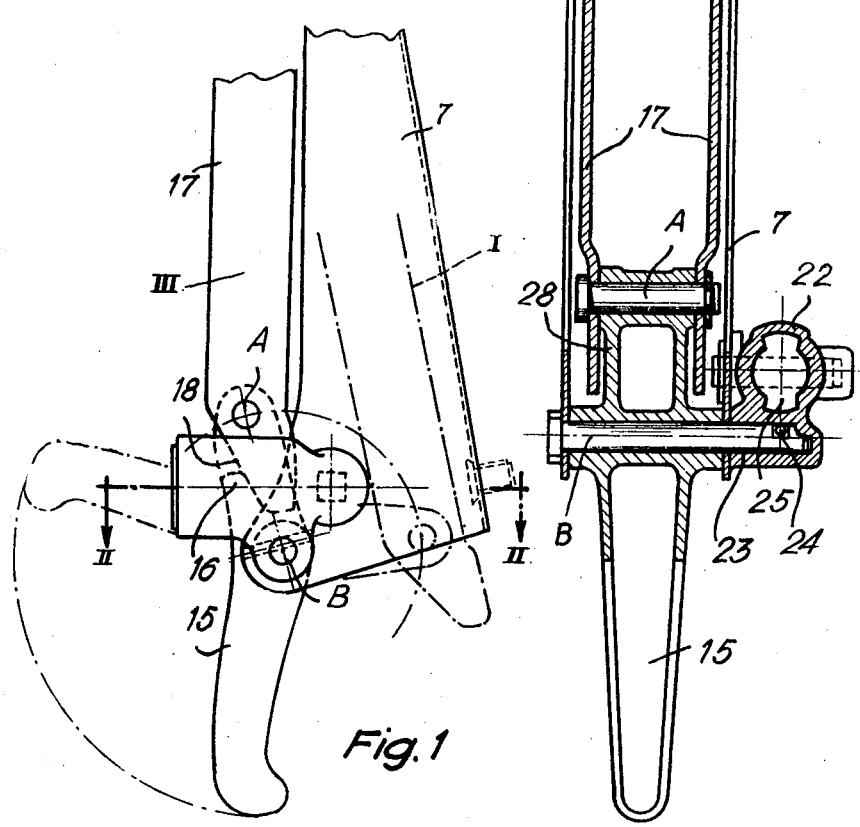
Fig. 1
Fig. 3
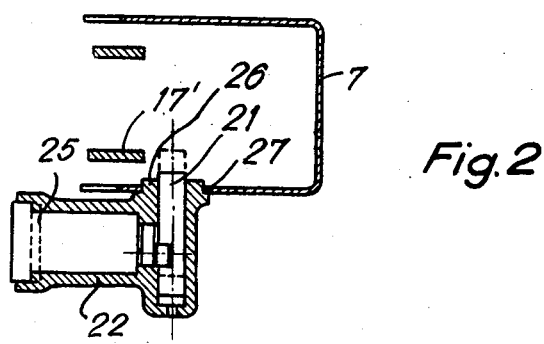
Fig. 2

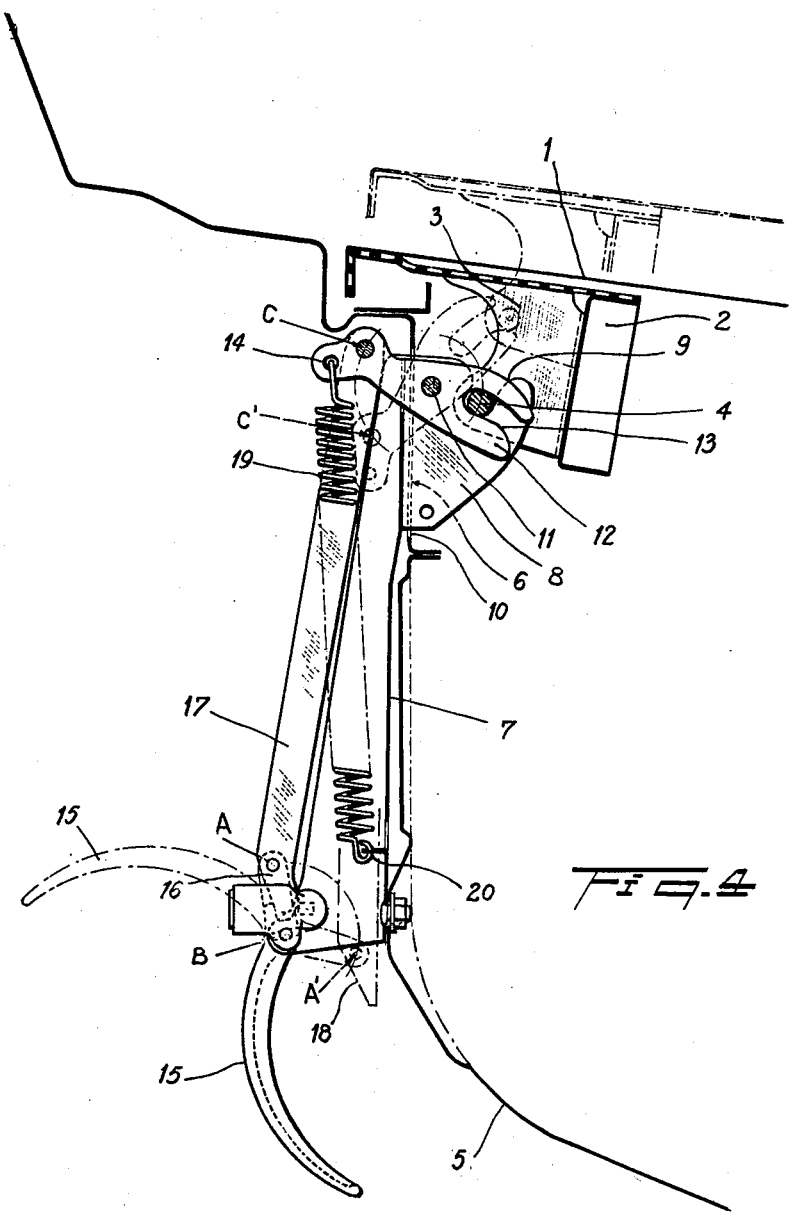

United States Patent Office 3,029,625
Patented Apr. 17, 1962

3,029,625
AUTOMOBILE HOOD LOCK
Lucien Peras, Billancourt, France, assignor to Regie Nationale des Usines Renault, Billancourt, France
Filed June 14, 1960, Ser. No. 35,923
1 Claim. (Cl. 70—240)

This invention relates to improvements in fasteners and like devices for locking the bonnets and lockers of automobiles, more particularly for locking the luggage lockers of vehicles.

In a prior patent dated April 8, 1959, No. 2,829,914, and filed by the same applicant there is described a locking mechanism for vehicle hoods wherein the main support, secured on the body side of a panel separating the locker from the body of the vehicle, has pivotally mounted on its lower portion the control lever or handle of which the portion extending beyond the pivot pin is formed with an eye receiving one of the pivot pins of the parallel links connecting the control lever to the hook and forming a toggle joint therewith. The improvements constituting the subject-matter of this invention consist in mounting on the support secured on the aforesaid panel a key-actuated lock adapted to hold one of the links connecting the control lever to the hook against movement in the closed position of the device which corresponds to the closed position of the locker.

The accompanying drawings show by way of example a typical form of embodiment of a locking device constructed according to this invention. In the drawings:

FIGURE 1 is a side elevational view showing the locking device of this invention mounted on a locker fastener of the type set forth;

FIGURE 2 is a section taken upon the line II—II of FIG. 1;

FIGURE 3 is a section taken through the plane containing the pivot axis of the control lever to show the manner in which the case of the locking device is mounted; and FIGURE 4 is a longitudinal section of the front portion of a vehicle with a hood equipped with a closure fastener in accordance with the invention.

Referring to the drawings, the fastener for automobile hood 1 comprises engageable means 4 fastened to hood 1, a control lever 15 fulcrumed on a pivot pin B and formed with an extension 28 in a toggle connection with a pair of parallel links 17 thereby controlling the displacement of the links 17 through the connection of the pivot pin A adjacent the lower end of the links. The pin B is rigid with a support 7 secured by screws (one of which is visible in dotted lines in FIG. 1) on a panel 5 of the vehicle body). A hook 12 extends through said panel 5 and is fulcrumed on a support bracket 8 intermediate its ends. One of said hook ends is pivoted by pin C to the upper end of link 17 and the other end extends through the panel into said locker for releasable engagement with engageable means 4.

FIGURE 1 also shows in chain-dotted lines at I the lower part of the lever and link assembly 15—17 in its open position with toggle connection unlocked, and at III the same assembly in its closed position. This position is obtained by causing the bevel surfaces 18 of links 17 to engage the lugs 16 of lever 15.

A locking device for this locker fastener comprises a bolt 21 adapted to engage one of the links 17 (the link 17' in the embodiment illustrated) of this locker fastener. The lock case 22 is formed with a transverse blind hole 23 in axial alignment with the pivot pin B (see FIG. 3), the case 22 being secured on the pivot pin B for example by means of an assembling pin 24. The bolt 21 is responsive to a barrel 25 mounted in the case 22 and actuated by means of a safety key. A shouldered projection 26 of this case which is concentric with the bolt 21 engages, and is fitted in, a hole 27 formed in the support 7 in order properly to position the lock case.

Therefore, this lock case is secured on the support 7 only by the extension of the pivot pin B and by the aforesaid shouldered projection 26.

Thus, the locking device of relatively simple construction is secured directly and without resorting to auxiliary parts on the support of the locker fastener.

Of course, this locking device may be operated, if desired, by means of the key used for switching on the ignition system and closing the door-locks of the vehicle.

I claim:

In a releasable hood fastener for an automobile having a hood separated from a passenger compartment by a panel, a hood lock comprising: engageable means secured to said hood, and engaging means for engaging said engageable means comprising a U-shaped support member attached to the passenger compartment side of said panel and having a bracket extending through into the hood side of said panel for supporting said hood in the closed position, hook means extending through said panel and pivotally mounted to movably cooperate with said support member to engage and disengage said engageable means when said hood is in the closed position, a link having oppositely disposed ends with one said end pivoted to said hook means for actuating said hook means to engage and disengage said engageable means, a pivot pin fixedly mounted in said support member and having an end extending therebeyond, a control lever pivotally mounted on said pivot pin and pivotally connected in a toggle joint to the other end of said link, said control lever operable to pivot on said pivot pin to first and second positions, pivoting to said first position engages said hook with said engageable means and locks said toggle joint thereby locking said hood against movement, and pivoting to said second position disengages said hook and engageable means and unlocks said toggle joint thereby releasing said hood for movement to its open position, a locking means for locking said control lever in said first position, said lock comprising a case mounted on the extending end of said pivot pin, said case having a key end and a bolt end, said bolt end being shouldered and engaging in a hole defined in said support member, a lock barrel having a key hole mounted in the key end of said case with said key hole adapted to receive a key, and a bolt slidably mounted in said bolt end of said case and operable by said lock barrel upon actuation of said lock barrel by rotation of said key in one direction to slide through said support hole to a position engaging said link to stop said link from pivoting and thereby unlocking said toggle joint, disengaging said hook and engageable means and operating the control lever, and said bolt being operable by said lock barrel upon actuation of said lock barrel by rotation of said key in a direction oposite to said one direction to slide said bolt clear of said link for unlocking said control lever, whereby said control lever, which operably locks said hood against any opening by other means than operation of said control lever, is locked against unauthorized operation by said locking means.

References Cited in the file of this patent

UNITED STATES PATENTS

| 1,434,277 | Aurand | Oct. 31, 1922 |
| 2,743,601 | Dlugatch | May 1, 1956 |
| 2,829,914 | Peras | Apr. 8, 1958 |